(12) United States Patent
Alston

(10) Patent No.: US 8,904,077 B1
(45) Date of Patent: Dec. 2, 2014

(54) POWER MANAGEMENT FOR HOST BUS ADAPTERS

(75) Inventor: Jerald K. Alston, Coto De Caza, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1470 days.

(21) Appl. No.: 12/111,057

(22) Filed: Apr. 28, 2008

Related U.S. Application Data

(60) Provisional application No. 60/946,359, filed on Jun. 26, 2007.

(51) Int. Cl.
*G06F 13/40* (2006.01)
*G06F 13/00* (2006.01)
*G06F 15/173* (2006.01)
*G06F 11/14* (2006.01)
*G06F 3/06* (2006.01)

(52) U.S. Cl.
CPC .......... *G06F 11/1423* (2013.01); *G06F 3/0635* (2013.01)
USPC ................. 710/307; 710/38; 710/18; 710/29; 709/239; 709/238; 709/224

(58) Field of Classification Search
CPC . G06F 13/4208; G06F 3/0635; G06F 9/3897; G06F 11/1423
USPC .............. 370/230, 230.1, 231, 235, 412, 428, 370/429, 366; 707/1–9; 710/1, 2, 22, 26
See application file for complete search history.

(56) References Cited

U.S. PATENT DOCUMENTS

| | | | |
|---|---|---|---|
| 5,325,517 A * | 6/1994 | Baker et al. ..................... 714/11 |
| 5,809,258 A * | 9/1998 | Bemanian et al. ............ 710/107 |
| 6,157,971 A * | 12/2000 | Gates ............................ 710/100 |
| 6,487,617 B1 * | 11/2002 | Gates ............................ 710/100 |
| 7,136,953 B1 * | 11/2006 | Bisson et al. ................. 710/307 |
| 7,469,311 B1 * | 12/2008 | Tsu et al. ...................... 710/307 |
| 2001/0055323 A1 * | 12/2001 | Rowett et al. ................. 370/537 |
| 2006/0112199 A1 * | 5/2006 | Sonksen et al. ................. 710/22 |
| 2008/0212474 A1 * | 9/2008 | Castaneda et al. ............ 370/235 |
| 2008/0307122 A1 * | 12/2008 | Butler et al. .................... 710/23 |

* cited by examiner

*Primary Examiner* — Joseph E Avellino
*Assistant Examiner* — Aftab Nasir Khan
(74) *Attorney, Agent, or Firm* — Klein, O'Neill & Singh, LLP

(57) ABSTRACT

Methods and apparatus for reducing power consumption in a host bus adapter (HBA) are provided. The methods include reducing a number of active lanes in an HBA link when link traffic is low, and increasing the number of active lanes when link traffic is high.

11 Claims, 7 Drawing Sheets

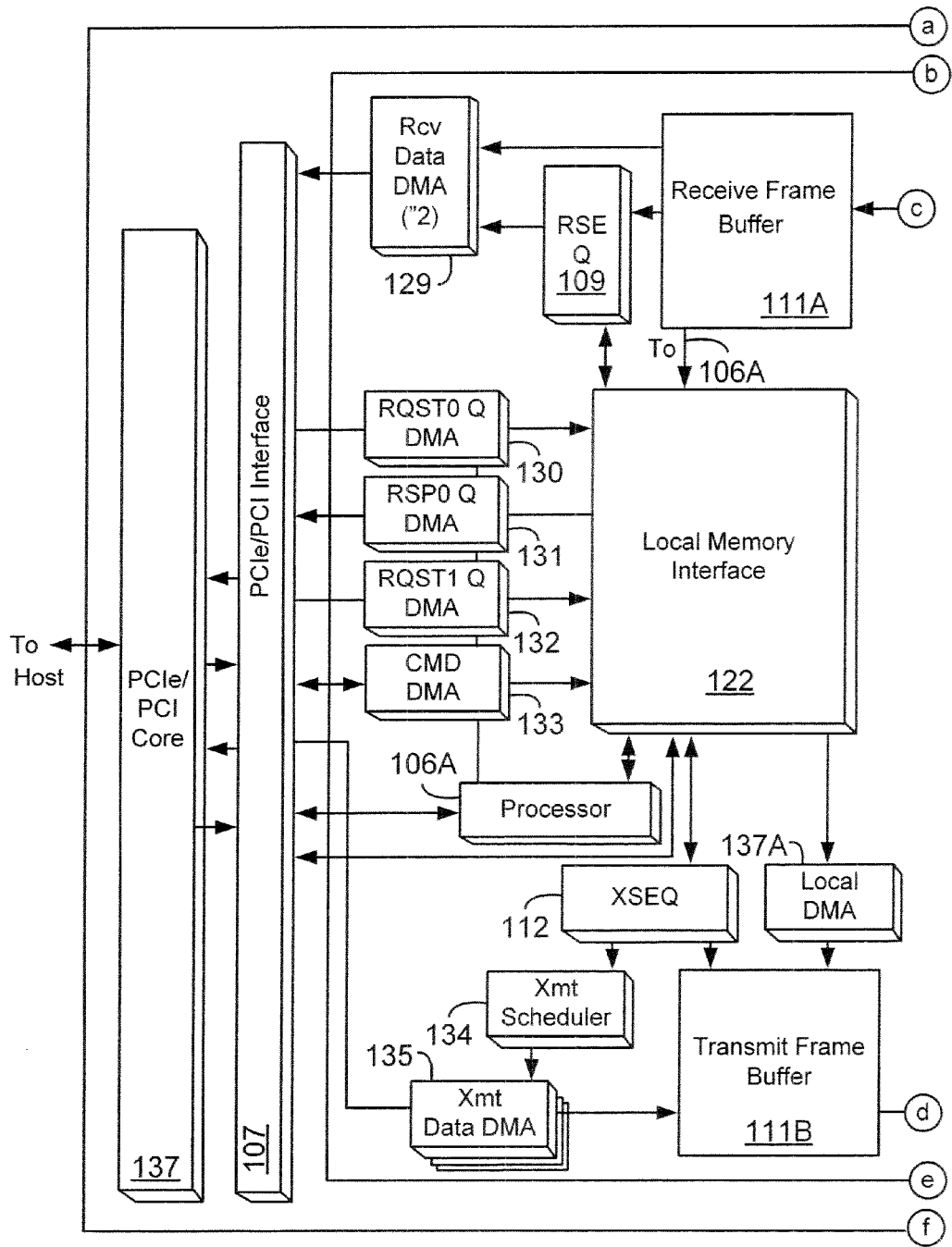
FIG. 1C-(i)

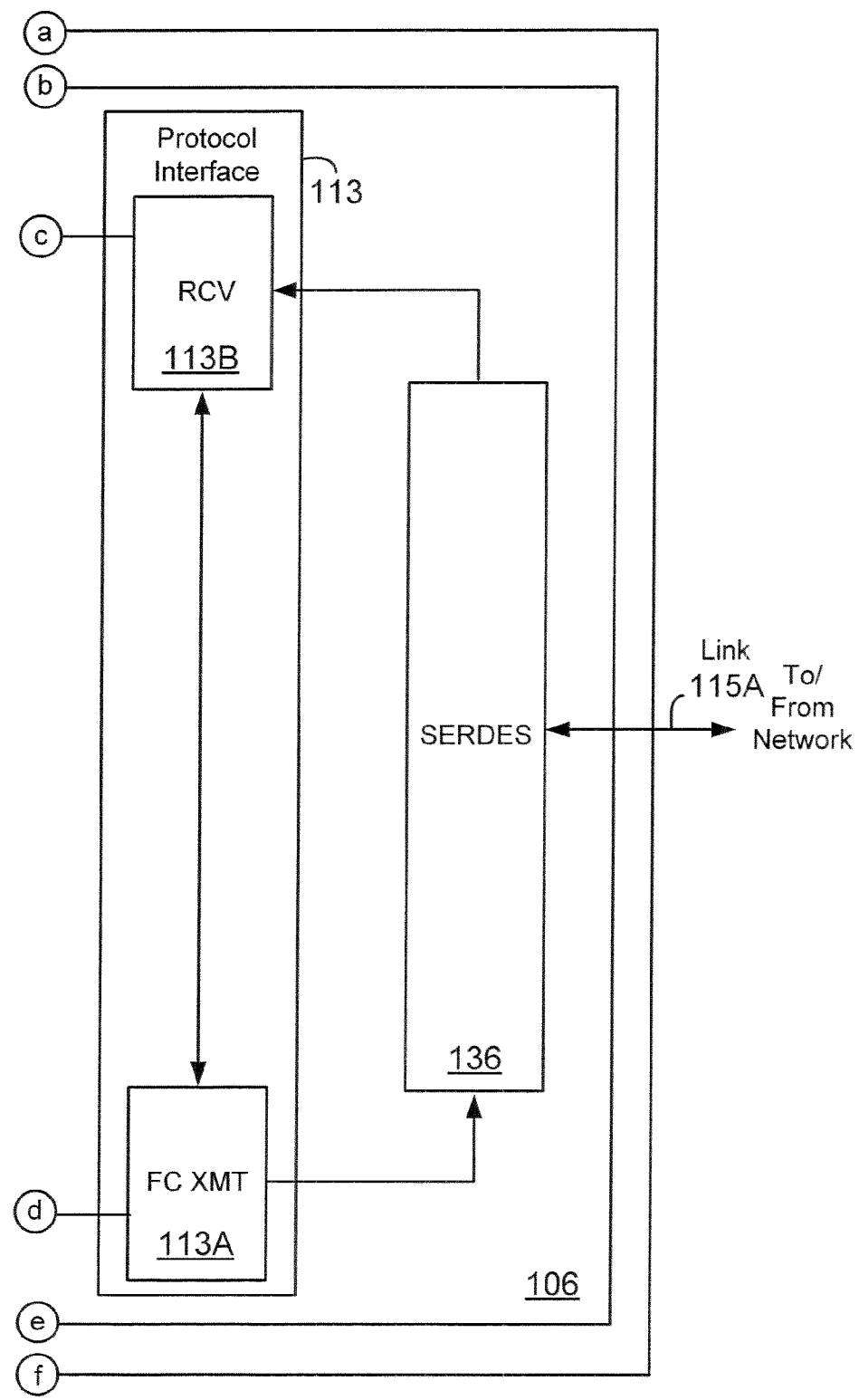
FIG. 1C-(ii)

POWER MANAGEMENT FOR HOST BUS ADAPTERS

CROSS-REFERENCE TO RELATED APPLICATIONS

This application claims priority to provisional application Ser. No. 60/946,359, filed on Jun. 26, 2007, the entire contents of which are hereby incorporated by reference.

TECHNICAL FIELD

The present disclosure relates to networking systems, and more particularly, to increasing the energy efficiency of networking systems.

BACKGROUND

Storage area networks ("SANs") are commonly used in systems where memory storage devices are made available to various computing systems (also referred to as "host systems"). Host systems often communicate with storage systems via a controller/adapter known as a host bus adapter ("HBA"), using a local bus standard, such as the Peripheral Component Interconnect ("PCI," "PCI-X," or "PCI-Express," all used interchangeably throughout the specification) bus interface. The PCI, PCI-X and PCI-Express standards are all incorporated herein by reference in their entirety.

Power consumption and control in network systems in general and HBAs in particular continue to be a challenge. Continuous efforts are being made to reduce power consumption.

SUMMARY

The present preferred embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description of the Preferred Embodiments," one will understand how the features of the present embodiments provide advantages, which include reduced power consumption.

One aspect of the present embodiments includes the realization that the operation and maintenance of network systems consumes power. It would, therefore, be desirable to increase the energy efficiency of network systems in order to generate cost savings and reduce the carbon footprint of network systems.

One embodiment of the present power management for host bus adapters comprises a method of allocating bandwidth in a link connecting a host bus adapter (HBA) with another device in a storage area network (SAN). The method comprises the step of evaluating an input/output (I/O) request relating to a data transfer between a host system and a storage device in the SAN. The method further comprises the steps of determining a byte count for the data transfer, and enabling or disabling lanes of the link based on the byte count. When link traffic is low, fewer lanes are enabled and when link traffic is high, more lanes are enabled.

Another embodiment of the present power management for host bus adapters comprises a host bus adapter (HBA) configured to be connected via a link with another device in a storage area network (SAN). The HBA comprises a processor. The processor is configured to evaluate an input/output (I/O) request relating to a data transfer between a host system and a storage device in the SAN, determine a byte count for the data transfer, and enable or disable lanes of the link based on the byte count.

BRIEF DESCRIPTION OF THE DRAWINGS

The present preferred embodiments now will be discussed in detail with an emphasis on highlighting the advantageous features. These embodiments depict the novel and non-obvious power management for host bus adapters shown in the accompanying drawings, which are for illustrative purposes only. These drawings include the following figures, in which like numerals indicate like parts:

FIG. 1C is a functional block diagram of an HBA configured for use with the present embodiments;

DETAILED DESCRIPTION

Figure 1A:
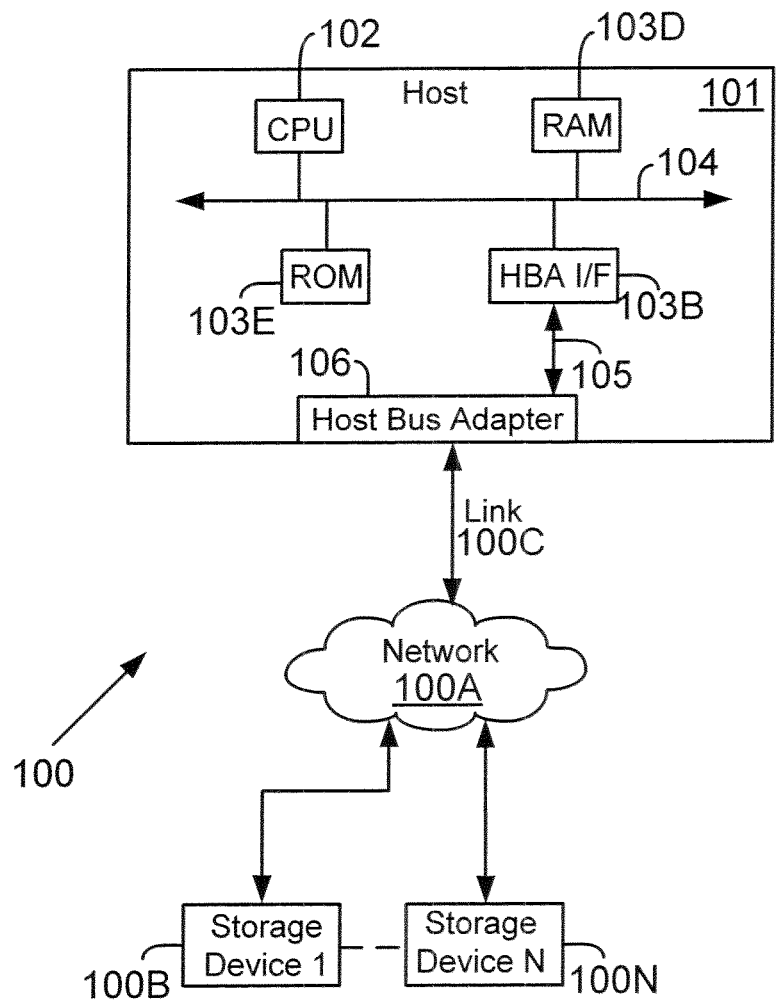
FIGS. 1A and 1B are functional block diagrams illustrating examples of host systems using an HBA to communicate with a plurality of storage systems and various other systems.

In the detailed description that follows, the present embodiments are described with reference to the drawings. In the drawings, elements of the present embodiments are labeled with reference numbers. These reference numbers are reproduced below in connection with the discussion of the corresponding drawing features.

To facilitate an understanding of the embodiments, the general architecture and operation of a SAN, a host system and an HBA are now described. The specific architecture and operation of the embodiments will then be described with reference to the general architecture.

Besides PCI, PCI-X or PCI-Express, other standards may be used to move data from host systems to memory storage devices in a SAN. Fibre channel is one such standard. Fibre Channel (incorporated herein by reference in its entirety) is an American National Standards Institute (ANSI) set of standards, which provides a serial transmission protocol for storage and network protocols such as HIPPI, SCSI, IP. ATM and others.

Fibre Channel supports three different topologies: point-to-point, arbitrated loop and Fibre Channel Fabric. The point-to-point topology attaches two devices directly. The arbitrated loop topology attaches devices in a loop. The Fibre Channel Fabric topology attaches host systems directly to a Fabric, which is connected to multiple devices. The Fibre Channel Fabric topology allows several media types to be interconnected. As those of ordinary skill in the art will appreciate, the adaptive aspects described herein are not limited to PCI or Fibre Channel standards.

SAN Overview:

FIG. 1A shows a system 100 with a computing or host system 101 representing a computer, server or other similar device, which may be coupled to plural storage devices or systems 100B-100N via network 100A. In general, host system 101 may typically include a host processor 102 (also referred to as a "central processing unit" or "CPU") coupled to computer bus 104 for processing data and instructions. In one embodiment. CPU 102 may be a Pentium Class microprocessor commercially available from the Intel Corporation or the equivalent.

A computer readable volatile memory unit 103D, for example, a random access memory (RAM) unit may be coupled with bus 104 for temporarily storing data and instructions for host processor 102 and other systems of host system 101. A computer readable non-volatile memory unit 103E, for example, read-only memory (ROM) unit, may also be coupled with bus 104 for storing non-volatile data and invariant instructions for host processor 102. HBA 106 (also referred to as "adapter 106" or "controller 106") interfaces with CPU 102 via an HBA interface 103B and a peripheral bus 105. HBA 106 interfaces with network 100A via link 100C.

Link 100C may operate at different transfer rates, for example, at 1 gigabits per second ("Gb" or "Gbps"), 2 Gb, 4 Gb, 8 Gb and 10 Gb to transfer data. The available transfer rate to move data via link 100C is referred to as bandwidth throughout this specification. In one embodiment, as described below, HBA 106 manages available bandwidth for different individual applications that use HBA 106 to communicate with various network devices.

Figure 1B:
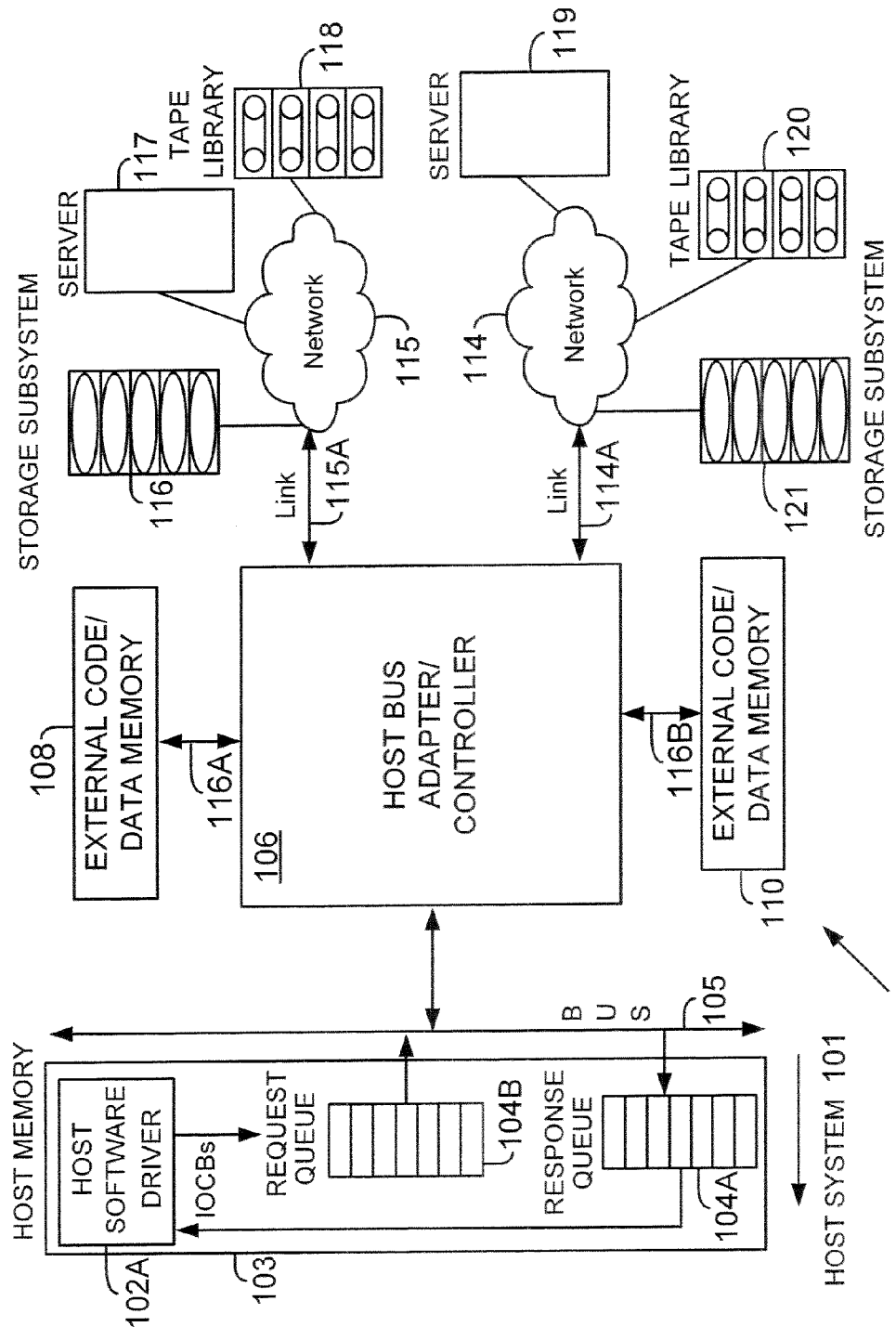

FIG. 1B shows another example of a system 100B where a host system 101 with host memory 103, uses HBA 106 to communicate with various systems, for example, storage subsystems 116, 121, tape libraries 118, 120, and server 117 via networks 114 and 115, similar to network 100A. Links 114A, 115A are used by individual HBA ports (not shown) and are similar to link 100C.

Host memory 103 includes a driver 102A that coordinates data transfer operations using input/output control blocks ("IOCBs"). A request queue 104B and response queue 104A are maintained in host memory 103 and are used for transferring information, including, but not limited to, various data and commands. HBA 106 has access to memory 108, 110 that it can access via connections 116A, 116B, respectively. HBA 106:

FIG. 1C shows a block diagram of adapter 106. Adapter 106 includes processors or state machines (may also be referred to as "sequencers") 109, 112 for transmit and receive side, respectively for processing data received from storage sub-systems; and transmitting data to storage sub-systems. Memory storage (or Buffers) 111A, 111B are used to store information in receive and transmit paths, respectively.

Transmit path in this context means data path from host memory 103 to the storage systems via HBA 106. Receive path means a data path from a storage subsystem to host memory 103 via HBA 106. In the illustrated embodiment, only one processor is used for receive and transmit paths. However, the adaptive aspects described herein are not limited to any particular number or type of processors.

HBA 106 also includes a processor 106A, which may be a reduced instruction set computer ("RISC") for performing various functions in HBA 106. RISC 106A executes software instructions to control overall HBA 106 operations. Adapter 106 receives and sends data and commands (may be referred to as information) via a serializer/deserializer (SERDES) 136. SERDES 136 converts data from 10-bit to 8-bit format and vice-versa.

HBA 106 also includes a protocol interface 113 that uses protocol specific commands and signals to process information to and from host system 101. The structure of protocol interface 113 depends on the network protocol. For example, if HBA 106 is coupled to Fibre Channel devices using the Fibre Channel protocol, then protocol interface 113 includes hardware and software to process Fibre Channel frames. In this example, protocol interface 113 may be referred to as a Fibre Channel interface or as a Fibre Channel Protocol Manager ("FPM"). Although protocol interface 113 is referred to hereafter as FPM 113, the adaptive aspects are not limited to any particular interface, standard or protocol.

Protocol Interface 113 includes a component 113A to handle all transmit path traffic and a component 113B to handle all network traffic received by HBA 106. This allows data to move to and from storage subsystems 116, 121, tape library 118, 120 and servers 117, 119 (FIG. 1B).

Adapter 106 is coupled to memory 108, 110 (referred to interchangeably hereinafter) through local memory interface 122 (via connection 116A, 116B, respectively, (FIG. 1B)). Local memory interface 122 is provided for managing local memory 108, 110. Local direct memory access (DMA) module 137A is used for gaining access to move data from local memory (108, 110).

HBA 106 further includes request queue DMA channel (0) 130, response queue DMA channel 131, request queue (1) DMA channel 132, which interfaces with request queue 104B and response queue 104A (FIG. 1B), and a command DMA channel 133 for managing command information.

Both receive and transmit paths have DMA modules 129, 135, respectively. Transmit path also has a scheduler 134 that is coupled to processor 112 and schedules transmit operations. Interface 107 is used by various HBA 106 components to gain access to bus 105 and communicate with various components of host system 101. PCI core 137 includes logic and circuitry to interface adapter 106 with PCI-Express bus 105.

Figure 1D:
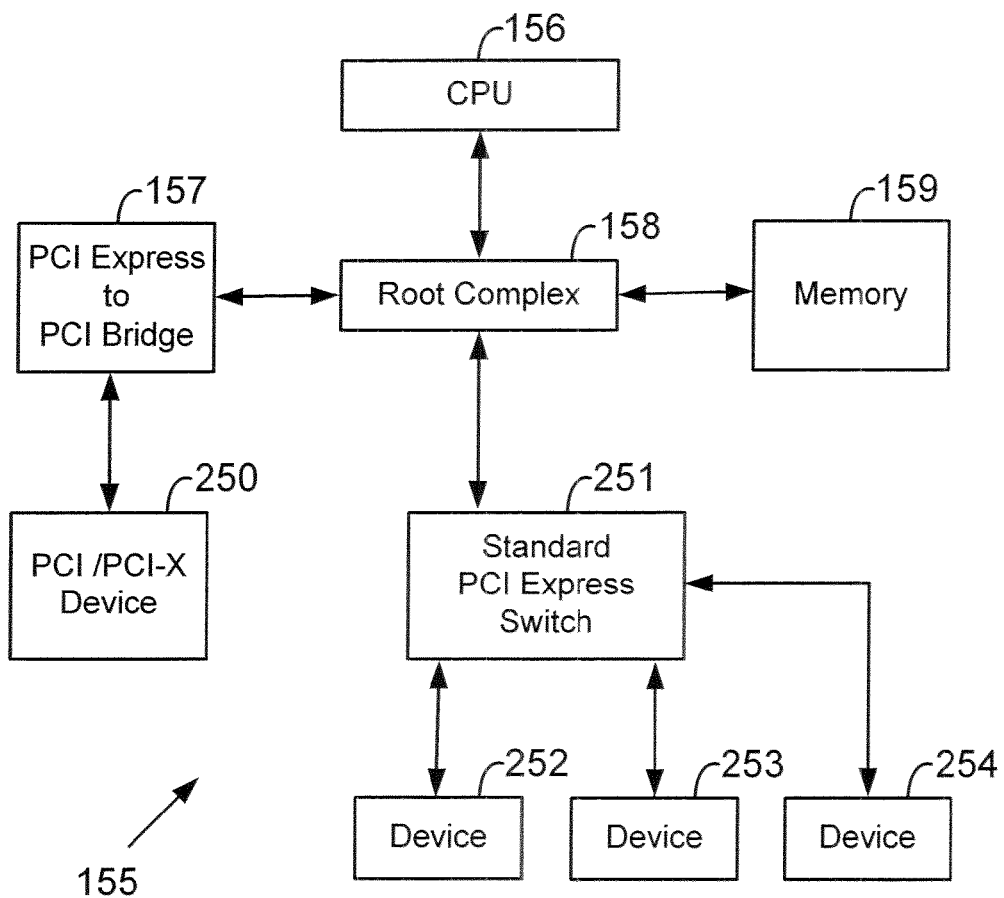
FIG. 1D is a functional block diagram of a PCI-Express fabric topology.

FIG. 1D shows a block diagram of a PCI-Express standard fabric topology 155. A central processing unit ("CPU") 156 (similar to 102) (part of a computing or host system) is coupled to a "root complex" 158. Root complex 158 as defined by the PCI-Express standard is an entity that includes a Host Bridge and one or more Root Ports. The Host Bridge connects a CPU to a Hierarchy, wherein a Hierarchy is the tree structure based on the PCI-Express topology.

Root complex 158 is coupled to a PCI-Express/PCI bridge 157 that allows CPU 156 to access a PCI (or PCI-X) device 250. Memory 159 is also coupled to root complex 158 and is accessible to CPU 156. In addition, Root complex 158 connects to a standard PCI-Express switch 251 (may be referred to as "switch") that is in turn connected to devices 252-254. CPU 156 can communicate with any of the devices 252-254 via switch 251. Alternatively, the path between root complex 158 and any of devices 252-254 may be a direct path with no switch, or it may contain multiple cascaded switches.

Figure 1E:
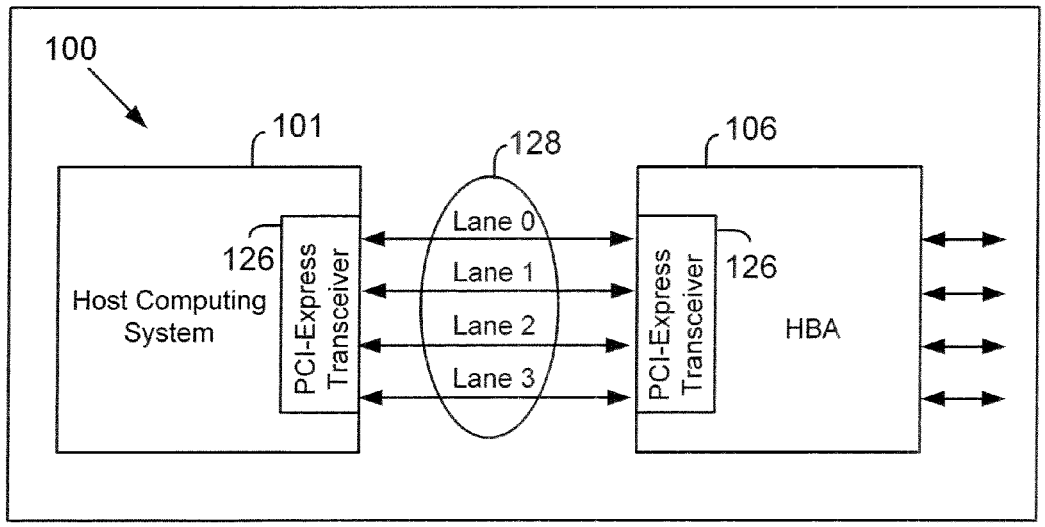
FIG. 1E is a functional block diagram of a host system communicating with an HBA via a PCI-Express link, according to the present embodiments.

FIG. 1E shows system 100 that includes a host computing system 101. Host system 101 uses PCI-Express transceiver 126 for communicating with a PCI-Express based host bus adapter 106 via link 128 comprising a plurality of lanes. HBA 106 also has a PCI-Express transceiver 126 for handling inbound and outbound information. A connection between two PCI-Express devices is called a link. For example, link 128 is established between PCI-Express transceivers (126). A PCI-Express link may consist of a single lane (x1) or may have two (X2), four (X4), eight (X8), twelve (X12), sixteen (X16) or thirty-two (X32) lanes.

PCI-Express provides a serial interface for transfer of data at two different rates, called generation 1 (GEN 1) and generation 2 (GEN 2) speeds. In GEN1, each lane transfers data at 2.5 Gbps and receives data at 2.5 Gbps for a total transfer of 5 Gbps. Each lane thus provides a peak bandwidth of 5 Gbps.

In GEN2, a serial clock operates at twice the speed of GEN1. In GEN2, each lane provides a peak bandwidth of 10 Gbps.

Typically, power consumption for a link depends on the number of lanes used. Typically, the lowest power is consumed by the PCI-Express transceiver 126 at GEN1 speed when only 1 lane is enabled. Highest power is consumed by transceiver 126 at GEN2 speed in X8 configuration as shown by Table 1 below.

TABLE 1

| Configuration | Transfer Speed | Bandwidth | Power Factor |
|---|---|---|---|
| X1 (one lane) | GEN1 | BW0 = 250 Mbytes/sec | Lowest Power |
| X1 (one lane) | GEN2 | BW1 = 500 Mbytes/sec | — |
| X4 (4 lanes) | GEN1 | BW2 = 1 Gbytes/sec | — |
| X4 (4 lanes) | GEN2 | BW3 = 2 Gbytes/sec | — |
| X8 (8 lanes) | GEN2 | BW4 = 4 Gbytes/sec | Highest Power |

Where:
- x=number of lanes
- GEN1=Generation 1 PCI-Exp
- GEN2=Generation 2 PCI-Exp The number of lanes used for data transmission is important for power consumption in PCI-Express based communication links. The present description provides an energy efficient network system for dynamically allocating lanes for communication between PCI-Express devices based on the amount of data that needs to be transmitted at any given time. Hence, only those lanes that are needed are active and overall power consumption is reduced.

According to one embodiment, bandwidth is allocated based on the amount of data that needs to be transferred at a given time (referenced as "byte count"). Lanes are disabled and enabled based on network traffic. When network traffic is low, fewer lanes are enabled (hence low power) and when network traffic is high, more lanes are enabled.

HBA processor 106A evaluates an input/output (I/O) request (i.e. to write or read data). Processor 106A determines a byte count for data transfer and enables or disables the number of lanes that may be needed at any given time. In one example, firmware (which is software for HBA 106) sets particular limits for enabling or disabling lanes. For example, Limit 1 may be a default parameter that is used to enable 1 lane at GEN 1 speed. Limit 5 may be the maximum number of lanes operating at GEN 2 speed. These limits are set based on byte count in real time.

Figure 2:
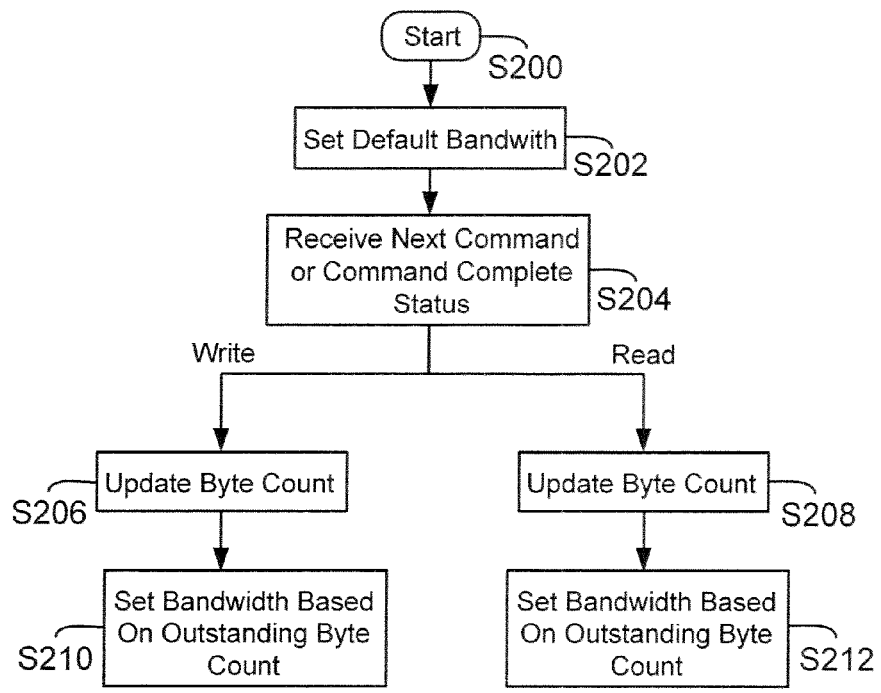
FIG. 2 is a process flow diagram of one embodiment of the present power management for host bus adapters.

FIG. 2 shows a process for activating lanes for data transmission, according to one embodiment. The process starts in step S200. In step S202 default bandwidth is set to BW0 by HBA 106 firmware. This will typically happen when HBA 106 is initialized. In step S204, HBA 106 determines whether the next operation is a write command, read command or a status command. For status commands, nothing happens. Write commands are handled in steps S206 and S210, while read commands are handled in steps S208 and S212.

In step S206, for a write command (data is sent to the computing system 101 from the network). HBA 106 determines the byte count, or the amount of data to be transferred in a given time. In step S210, the bandwidth is set based on an updated byte count. In step S208, for a read command HBA determines the byte count. In step S212, the bandwidth is set based on an updated byte count.

In the process of FIG. 2, link speed is dynamically selected to ensure fewer lanes are used for data transfer.

Figure 3:
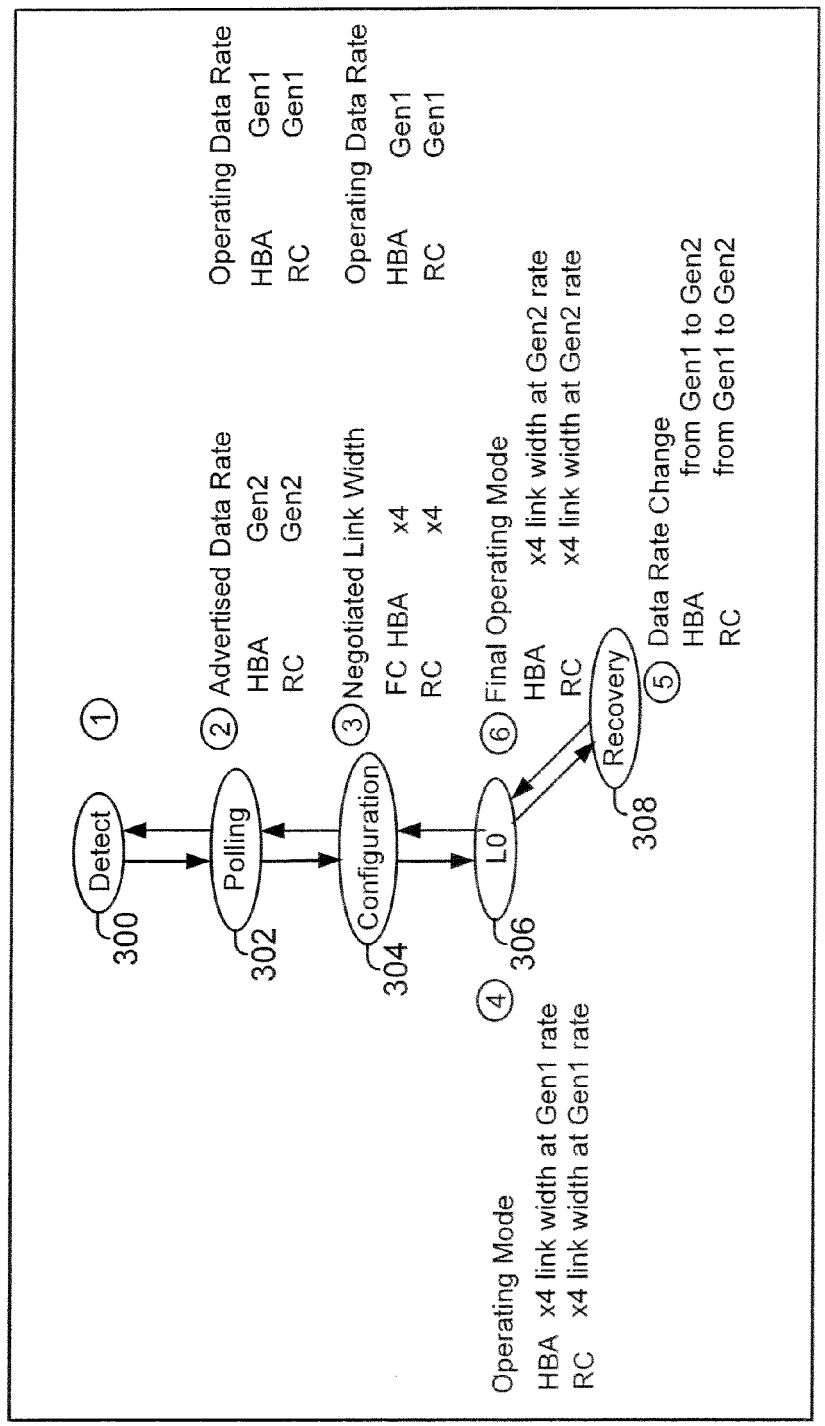
FIG. 3 is a state machine diagram for link assignments according to one embodiment of the present power management for host bus adapters.

FIG. 3 shows a state machine diagram for link assignments, according to one of the present embodiments. In a "detect state" 300. PCI-Express transceiver 126 exchanges information to detect presence of other components (or devices). In a "polling state" 302, transceivers 126 advertise data rate capabilities between the PCI-Express devices (e.g. 252, 253 or 254) on the link 128. While link 128 may still operate at the GEN1 rate in this state, the maximum data rate capability advertised by the HBA 106 in this state may be GEN2.

In a "configuration state" 304, at GEN1 data rate, the devices on Link 128 exchange information about the number of lanes supported by link 128. The final lane width is established at the lower lane width for the two devices. For example, one device (e.g. 252) may advertise support for x8 lanes, and the other device (e.g. 250) may advertise support for x4 lanes. The final number of lanes between these two devices is established at x4 lanes. If the root complex 158 is GEN2 capable and supports x8 lane widths, HBA 106 negotiates an x4 link width. If the root complex 158 advertised data rate is GEN1 and supports x8 lanes. HBA may negotiate an x8 link width.

In "L0 state" 306, link 128 is active and enabled for use. Both PCI-Express link partners (devices on the PCI link 128) may still be communicating at GEN1 data rate and at a negotiated lane width. If the negotiated data rate is GEN2 when the L0 state is entered, the root complex 158 may initiate entry into a Recovery state 308 to change the actual link data rate to GEN2 speed. Either HBA 106 or root complex 158 may initiate this entry. However, in one aspect HBA 106 waits for the root complex 158 to initiate entry into the Recovery state 308. If the negotiated data rate was GEN1 when L0 (306) is entered, no further steps are needed and the link simply operates.

In the Recovery state 308 the actual data rate change occurs after the L0 state 306 has been reached and if the GEN2 data rate is supported by both devices on Link 128. If both devices support the GEN2 data rate. HBA 106 and root complex 158 change the data rate to GEN2. The process then moves back to state 306, where both devices transition to the L0 state, operating at the GEN2 data rate with an x4 link width. This allows Link 128 to be established using fewer lanes, thereby reducing power consumption.

SCOPE OF THE INVENTION

The above description presents the best mode contemplated for carrying out the present power management for host bus adapters, and of the manner and process of making and using it, in such full, clear, concise, and exact terms as to enable any person skilled in the art to which it pertains to make and use these embodiments. These embodiments are, however, susceptible to modifications and alternate constructions from that discussed above that are fully equivalent. Consequently, this power management for host bus adapters is not limited to the particular embodiments disclosed. On the contrary, this power management for host bus adapters covers all modifications and alternate constructions coming within the spirit and scope of the power management for host bus adapters as generally expressed by the following claims, which particularly point out and distinctly claim the subject matter of the power management for host bus adapters.

What is claimed is:
1. A method of allocating bandwidth in a link connecting an adapter with another device in a storage area network (SAN), the method comprising:
   a) evaluating an input/output (I/O) request relating to a data transfer between a host system and a storage device in the SAN;

b) determining an amount of data that will be transferred at a given time, including data associated with the I/O request; and c) enabling or disabling lanes of the link based on the amount of data that will be transferred at the given time, including the data associated with the I/O request;

wherein when link traffic is below a first limit, a first number of lanes are enabled, and more lanes are enabled when the link traffic increases above the first limit.

2. The method of claim 1, wherein a processor in the adapter performs steps a) through c).

3. The method of claim 1, wherein firmware in the adapter sets limits for enabling and disabling the lanes.

4. The method of claim 1, further comprising the step of setting a default bandwidth for the link as the first limit.

5. The method of claim 4, wherein according to the default bandwidth one of the lanes is enabled and all other lanes are disabled.

6. The method of claim 5, wherein according to the default bandwidth the enabled lane is enabled at generation 1 (GEN 1) speed.

7. An adapter configured to be connected via a link with another device in a storage area network (SAN), the adapter comprising:

a processor;

wherein the processor is configured to evaluate an input/output (I/O) request relating to a data transfer between a host system and a storage device in the SAN, determine an amount of data that will be transferred at a given time, including data associated with the I/O request, and enable or disable lanes of the link based on the amount of data that will be transferred at the given time, including the data associated with the I/O request.

8. The adapter of claim 7, wherein when link traffic is low, fewer lanes are enabled and when link traffic is high, more lanes are enabled.

9. The adapter of claim 7, further comprising firmware in the adapter configured to set limits for enabling and disabling the lanes.

10. The adapter of claim 7, wherein according to a default bandwidth for the link one of the lanes is enabled and all other lanes are disabled.

11. The adapter of claim 10, wherein according to the default bandwidth the enabled lane is enabled at generation 1 (GEN 1) speed.

* * * * *

UNITED STATES PATENT AND TRADEMARK OFFICE
CERTIFICATE OF CORRECTION

PATENT NO. : 8,904,077 B1  
APPLICATION NO. : 12/111057  
DATED : December 2, 2014  
INVENTOR(S) : Jerald K. Alston Page 1 of 1

It is certified that error appears in the above-identified patent and that said Letters Patent is hereby corrected as shown below:

In the Specification

In column 2, line 24, delete "embodiments:" and insert -- embodiments; --, therefor.

In column 2, line 50, delete "IP." and insert -- IP, --, therefor.

In column 3, line 3, delete "embodiment." and insert -- embodiment, --, therefor.

In column 5, line 51, delete "S204." and insert -- S204, --, therefor.

In column 5, line 57, delete "network)." and insert -- network), --, therefor.

In column 5, line 67, delete "300." and insert -- 300, --, therefor.

Signed and Sealed this  
Seventh Day of April, 2015

Michelle K. Lee  
*Director of the United States Patent and Trademark Office*